Feb. 9, 1960   F. W. SAMPSON   2,924,303
BRAKE STRUCTURE
Filed Jan. 17, 1957
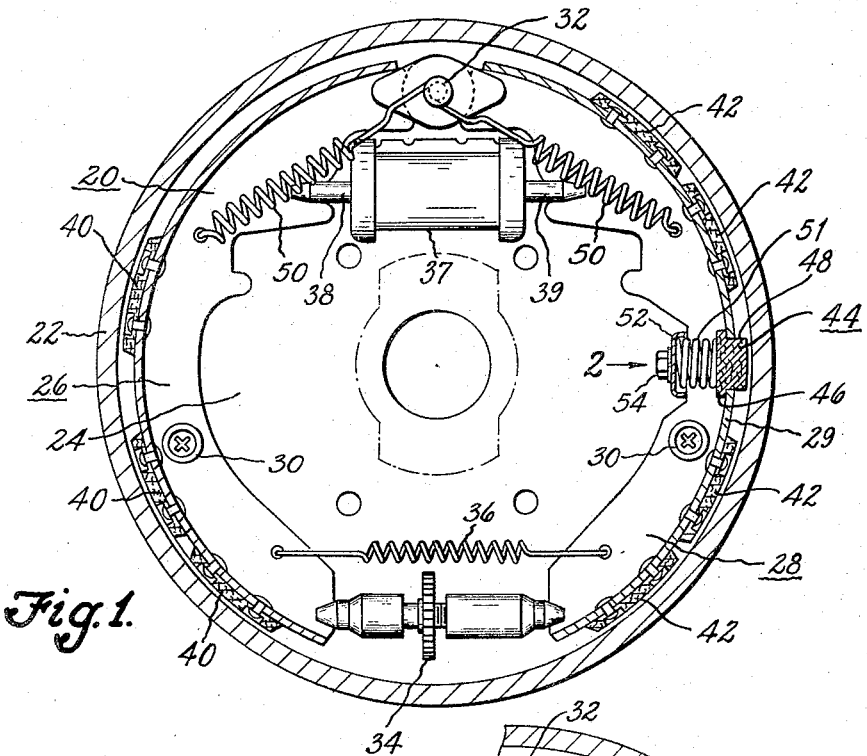
Fig. 1.
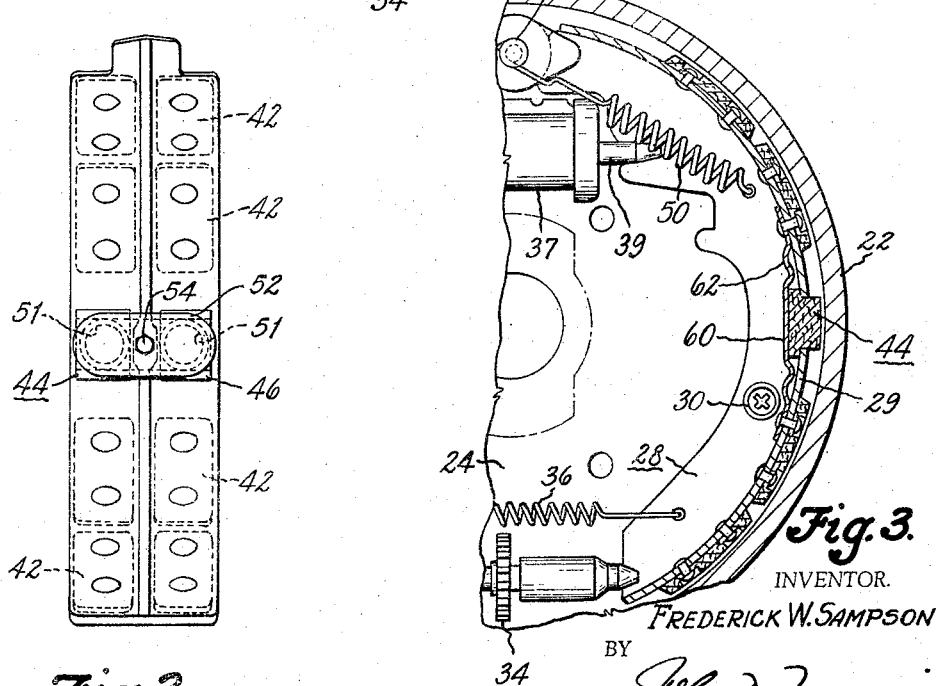
Fig. 2.
Fig. 3.
INVENTOR.
FREDERICK W. SAMPSON
BY
ATTORNEY United States Patent Office 2,924,303
Patented Feb. 9, 1960

2,924,303

BRAKE STRUCTURE

Frederick W. Sampson, Dayton, Ohio, assignor to General Motors Corporation, Detroit, Mich., a corporation of Delaware Application January 17, 1957, Serial No. 634,781

5 Claims. (Cl. 188—78)

This invention relates to a vehicle brake and is particularly concerned with a heavy duty vehicle brake having uniform braking characteristics.

In certain types of vehicle brakes, the linings thereof are formed from porous, ferrous material including substantial quantities of graphite. Such a brake lining is clearly disclosed in copending application, S.N. 540,842, filed October 17, 1955, and assigned to the asignee of the present invention. These linings have extremely good braking characteristics and are long wearing.

When these linings are used in the standard type of internal expanding brakes, for example, wherein two brake shoes are used which are forced outwardly into contact with a rotating brake drum, they have a tendency to "grab," "grunt" or "groan" at the time the vehicle is being drawn to a complete stop. This is caused by the fact that the ferrous friction material has a high coefficient of static friction which generally exceeds and is at least equal to its coefficient of dynamic friction and, therefore, when the speed of the vehicle is reduced as it approaches a stop, there is a tendency for the lining to "grab" at the instant of stopping which causes jerky operation in some instances just before the vehicle is stopped. This condition is not apparent when using standard resin bonded types of linings since these linings, for example, linings as disclosed in U.S. Patents 2,569,539 and 2,553,215, generally have lower coefficients of static friction than their coefficient of dynamic friction and, in any case, their coefficient of static friction does not exceed their coefficient of dynamic friction. Therefore, as the vehicle comes to a stop, the effective coefficient of friction drops off which prevents the "groaning" and "grunting" and attendant "grabbing" of the brakes.

When a brake of the internal expanding type is applied, due to the pressures involved and the points of application thereof, the brake shoes are actually distorted slightly out of round as is the brake drum. I have found, therefore, that when the brake is being released as the vehicle comes to a stop, the actual area of final contact of the shoe and drum occurs adjacent the center portion of the shoe only due to this distortion which, upon release of pressure, permits the shoe and drum to assume their normal shape. This means that the arc of the shoe and the arc of the drum at the instant of stopping are essentially tangential to one another in a transverse zone herein called the area of final contact. This out-of-round condition of the components of the brake is more easily explained by the fact that the pressure during braking is applied adjacent the ends of the shoe and supported by the drum throughout its length, causing the drum to become somewhat elliptical. Upon release of pressure, both drum and shoe assume their normal radii whereby the shoe is out of round or of a smaller radius with respect to the drum. In any case, there is an area of final contact and it is braking within this area that causes the undesirable "grab," "grunt" or "groan," when the lining has a coefficient of static friction in excess of its coefficient of dynamic friction.

It is, therefore, the main object of this invention to provide a friction lining for a brake shoe, such as a secondary brake shoe, which is segmented and includes two end portions of a friction material which has a static coefficient higher than its coefficient of dynamic friction and an intermediate or center portion of another friction material which has a coefficient of static friction not exceeding its coefficient of dynamic friction, and wherein the intermediate portion is spring biased under predetermined spring pressure.

It is another object of the invention to provide a segmented brake lining, including porous, ferrous friction facings, having a spring biased portion of another friction facing interposed radially therebetween wherein the interposed portion of facing has a coefficient of static friction which does not exceed its coefficient of dynamic friction, the area of the ferrous friction facing being greater than the area of the interposed facing.

Another object of the invention is to provide a segmented brake lining including one type of facing portion and including an interposed portion of another type of friction material positioned intermediate portions of the first mentioned facing material which second mentioned portion is spring biased relative to the remainder of the lining so as to be capable of movement relative thereto against the bias.

A still further object of the invention is to provide a brake assembly for a vehicle comprising a rotatable brake drum and including two brake shoes therein, each of said shoes having brake linings thereon in opposed relation to one another and adapted to bear on the internal surface of the drum, expansible means being provided for forcing the shoes into braking contact with the drum, at least one of said shoes having a friction facing thereon and including, at the area of final contact between the shoe and the drum, upon stopping, a portion which is spring biased relative to the remainder of the facing.

Further objects and advantages of the present invention will be apparent from the following description, reference being had to the accompanying drawings wherein preferred embodiments of the present invention are clearly shown.

In the drawings:

Figure 1 is a plan view, partly in section, of an internal expanding brake including a brake drum, primary and secondary shoes with linings and operating mechanism.

Figure 2 is a plan view of the lining components of the secondary shoe taken in the direction of the arrow in Figure 1.

Figure 3 is a fragmentary view similar to the view shown in Figure 1 showing a modified spring bias on the intermediate friction portion of the shoe.

Referring specifically to the drawings, one form of an internal expanding brake is shown at 20 in Figure 1 which may be used in connection with vehicles such as automobiles and the like. The brake includes a drum 22 usually formed from cast iron or other suitable material which is carried by a wheel. A support plate 24 carried by the axle housing acts as a support for the components of the expanding brake mechanism which includes primary shoe 26 and a secondary shoe 28 loosely held to the support plate 24 by means of spring pressed clips 30 which pass through over-sized holes, not shown, so the shoe may shift with respect thereto. The primary and secondary shoes 26 and 28 are rotatable around a pivot point 32 at the top of the assembly and held thereto by springs 50. The shoes are adjustable with respect to the brake drum by means of a screw adjustment 34 between their lower ends. The adjustment 34 is held in place by a spring 36. At the upper end and supported on the plate 24 is a brake cylinder 37 having opposed pistons 38 and 39 therein which are actuated by fluid from a system, not shown. Supported on and carried by the primary shoe 26 are a plurality of brake lining blocks 40; in this case, riveted to the shoe and comprising segments of friction material preferably porous ferrous material. Attached to plate 29 and carried by the brake shoe 28 is also a plurality of friction blocks 42 and 44. In this instance, all of the blocks 42 are the same type of friction material while the blocks 44 are of a different material. For example, the blocks 42 may be porous ferrous friction material as hereinbefore defined while the blocks 44 may be a porous bronze friction material with graphite of the type disclosed in Short Reissue Patent 21,495, for example, or, for that matter, any other friction material, metallic or nonmetallic, which will meet the requirements of having satisfactory frictional characteristics while having a coefficient of static friction not in excess of its coefficient of dynamic friction.

In the present instance, the blocks 44 are made with a shoulder portion 46 thereon and a reduced dimension portion 48 which passes through an aperture in the supporting plate 29 and which has a thickness at least equal to the thickness of plate 29 and blocks 42. The shoulder 46 limits the outward movement of the block 44 and also acts as an abutment for a spring member 51 which bears against the block and forces the same resiliently outwardly so that the shoulder 46 is in contact with the support 29. The opposite end of the spring 51 is anchored to the shoe 28 by means of support 52 and bolt 54. Viewing Figure 2, it will be seen that a single support 52 may act as an abutment for both springs of the side by side friction members 44 or these members may be made into a single member, all of which deviations come fully within the scope of this invention.

Figure 3 shows a modification of the design wherein shouldered buttons 44 are used but are held to the shoe by means of a corrugated flat spring 60 riveted or otherwise attached to the support 29. The corrugations 62 in the spring permit flexing thereof so that the member 44 may move relative to the shoe. In both cases, the spring member 51 or 60 is preferably formed so as to exert about 150 pound force on the member 44. It will be noted that the blocks are positioned in the area of final contact when the brakes are released.

This is explained in more detail by describing the action of the brake. When the brake pedal is depressed, fluid from the hydraulic system enters the cylinder 37 and causes the pistons 38 and 39 to move outwardly away from one another which causes the brake bands 26 and 28 to move outwardly into contact with the brake drum 22. It is apparent that the end portions only of the band or shoe have outward forces exerted thereagainst while the drum is resisting these forces throughout the shoe length. Therefore, the shoe distorts increasing its radius with respect to the drum radius under load and a common wear radius results while under load. Similarly, as the brake shoe is pressed outwardly, the drum 22 will distort to conform to the distortion of the brake shoe which will cause the entire drum to assume a somewhat elliptical shape. These facts are proved by wear on the brake linings which always will rock in a drum when not under load showing that the unloaded shoe radius is smaller than the unloaded drum radius. Upon release of the brake and upon release of fluid pressure in the cylinder 37, springs 50 will draw the brake shoes inwardly away from the drum 22. When this occurs, the drum tends to assume its normal circular shape while the brake shoes, with their linings, move away from the drum. This leaves the segment 44 on the secondary shoe in an area of final contact between the shoe and the drum and it is at this point in the operation that the vehicle is coming to a complete stop. At this point, therefore, the static coefficient of friction of the material comes into play and, if this is higher than its dynamic coefficient of friction, the brake lining tends to "grab" and cause a "grunt" or "groan" as the vehicle comes to a complete stop.

As hereinbefore set forth, if a pad or segment of lining material is positioned within this area of final contact wherein the friction material of the pad or segment has a static coefficient of friction not in excess of its dynamic coefficient of friction, the vehicle will come to an easy stop without "grabbing" and attendant "groaning." By spring biasing the blocks 44, it is apparent that when the brake is in full engagement that the springs 51 are compressed and the blocks 44 are pressed inwardly so that their shoulders 46 are out of contact with the band 29. As the brake pedal pressure is reduced, and the brake and drum tend to assume their normal shape, the blocks 42 lose contact with the drum surface and the springs 51 cause the blocks 44 to follow and remain in contact with the drum. However, since the shoulders 46 are provided, there is a limit to this engagement. However, it is quite apparent that the blocks 44 are the area of last contact and are resiliently engaged with the drum through a portion of their activity and are then finally removed from contact with the drum as the brake is finally released. Just prior to the point, the vehicle will come to a complete stop and since the static coefficient of friction used in the blocks 44 does not exceed its dynamic coefficient of friction, no "groan" or "grunt" is apparent as the complete stop is made.

I have found that it is unnecessary to modify the primary shoe lining since this shoe acts in an additive manner to enhance the operation of the secondary shoe and does not contribute to the "grunting" and "groaning" during the final stop of the vehicle.

The use of the same combination on each shoe of a two leading shoe type brake or in a leading and trailing shoe brake is also within the scope of my invention and the specific brake described is used for illustrative purposes only. In fact, in any instance where "grabbing" and attendant "grunting" and "groaning" is experienced in brakes, due to the use of a lining which has a coefficient of dynamic friction less than its coefficient of static friction, the use of a segment of a friction material whose static coefficient does not exceed its dynamic coefficient of friction placed in the area of last contact will improve the condition greatly and substantially eliminate the undesirable noises.

While specific friction materials have been set forth here such as ferrous friction material and the porous bronze friction material, it is apparent that the present invention is useful in eliminating "groan" and "grunt" in any instance where the friction lining is made up of a material which has a dynamic coefficient of friction less than its static coefficient of friction and wherein the interposed or intermediate spring biased segment is a friction material having a static coefficient of friction which does not exceed its dynamic coefficient of friction.

The wear of the intermediate segments or blocks will be substantially the same as the wear of the remainder of the brake since this is dictated by the overall wear pattern of the brake. It is apparent that many modifications in structure may be made to obtain the same results, and that the structures disclosed here are merely examples of two structures that may be used to accomplish the desired end.

While the embodiments of the invention as herein disclosed constitute preferred forms, it is to be understood that other forms might be adopted.

What is claimed is as follows:

1. A brake shoe for an internal expanding brake which includes, operating means and a brake drum adapted to rotate relative to the shoe, the combination comprising, an arcuate metal support, a plurality of generally arcuate metal lining segments comprising porous ferrous material with graphite attached to and carried by said support, and a segment spring loaded into contact with the drum and formed of another friction material which has a coefficient of static friction that does not exceed its coefficient of dynamic friction, said last mentioned segment being mounted on and positioned adjacent the area of final contact between the shoe and the drum when the relative rotation between the two ceases.

2. A brake shoe for an internal expanding brake which includes, operating means and a brake drum adapted to rotate relative to the shoe, the combination comprising, an arcuate metal support, an even number of generally arcuate metal lining segments, comprising porous ferrous material with graphite, attached to and carried by said support, and a single segment spring loaded into contact with the drum and formed of another friction material which has a coefficient of static friction that does not exceed its coefficient of dynamic friction positioned between said metal lining segments so that an equal number of metal lining segments are present at either side thereof, said single segment being mounted on and positioned adjacent the area of final contact between said shoe and the brake drum when the relative rotation between the two ceases.

3. The assembly as claimed in claim 2 wherein the single spring-loaded segment is supported by a coil spring.

4. The assembly as claimed in claim 2 wherein the single spring-loaded segment is supported by a leaf spring.

5. A brake assembly for a vehicle comprising a rotatable brake drum, relatively stationary brake shoes in opposed relation to one another and adapted to bear against the internal surface of said drum, means cooperating with the shoes for expanding them into frictional engagement with the drum, friction linings on said shoes, the friction lining on at least one of said shoes consisting of an arcuate facing formed from two separate and different components, the first of which exceeds the area of the second and has a static coefficient of friction greater than its dynamic coefficient of friction, the second component being positioned intermediate portions of the first mentioned component and at the area of final contact between the shoe and drum when the brake is being released after having been in braking position, a spring mounting for associating said second component with the shoe and said second component having a static coefficient of friction that does not exceed its dynamic coefficient of friction.

References Cited in the file of this patent

UNITED STATES PATENTS

| | | |
|---|---|---|
| 2,355,419 | Bruce | Aug. 8, 1944 |
| 2,431,774 | Schumacher | Dec. 2, 1947 |
| 2,718,936 | Rohrer et al. | Sept. 27, 1955 |
| 2,764,265 | Runner | Sept. 25, 1956 |

FOREIGN PATENTS

| | | |
|---|---|---|
| 701,725 | Great Britain | Dec. 30, 1953 |